3,585,109
NOVEL PROCESS OF PRODUCING
L(+)-TARTARIC ACID
Koichi Yamada, Tokyo, Yasuji Minoda, Chiba, and Tohru Kodama and Uichiro Kotera, Tokyo, Japan, assignors to the United States of America as represented by the Secretary of Agriculture
No Drawing. Filed Mar. 3, 1969, Ser. No. 803,957
Int. Cl. C12d 1/06
U.S. Cl. 195—47                                                                   1 Claim

ABSTRACT OF THE DISCLOSURE

L(+)-tartaric acid is produced in higher yield by the use of *Gluconobacter suboxydans* on a medium containing more than 0.1 mg./l. of pantothenic acid.

This invention relates to a novel process of producing L(+)-tartaric acid and, more particularly, is concerned with the production of L(+)-tartaric acid by the culture of Gluconobacter strains producing L(+)tartaric acid on a medium containing more than 0.1 mg./l. of pantothenic acid or salts thereof and methods for its recovery and purification.

The fermentation of producing L(+)-tartaric acid is generally shown in U.S. Pat. No. 2,314,831 to Kamlet which teaches the production of L(+)-tartaric acid by *Acetobacter suboxydans*. However, the prior art fermentation method is devoid of the superiority in yields of L(+)-tartaric acid. This is why the inventors have accomplished the improved fermentation by culturing Gluconobacter strains producing L(+)-tartaric acid. The superior method is to add more than 0.1 mg./l. of pantothenic acid or salts thereof to a fermentation medium.

The organisms which are employed in the valuable process of this invention were obtained from fruits. The isolated cultures were identified as a member of the known species *Gluconobacter suboxydans*, and designated as *G. suboxydans* 1945 $Y_3$, 1993 $Y_1$, 2026 $Y_2$ and 2026 $Y_3$. These strains have the same characteristics as described below, and these natures are common to all unless otherwise mentioned:

(1) Morphological characteristics:

Rod, 0.4–0.6 x 1.0–1.8 microns, motile with a polar flagellum.

(2) Cultural characteristics:

Mannitol agar colonies: circular, entire, with semitransparent, lustrous, smooth surface; pale yellow-orange colored butter-like colony.
Mannitol agar slant: Good growth, filiform, lustrous, dull orange in color.
Glutamate agar slant: No growth.

(3) Physiological properties:

(a) No utilization of ammonium nitrogen, and glucose, ethanol and mannitol as a sole assimilable carbon.
(b) No oxidation of acetate and lactate.
(c) Production of dihydroxyacetone from glycerol.
(d) Acetic acid from ethanol.
(e) No production of carbonate from lactate.
(f) Production of ferric chloride positive materials from fructose.
(g) Acid from glycerol, xylose, arabinose, glucose, galactose, fructose, mannose, sucrose, mannitol and ethanol without the emission of gas.
(h) No acid from maltose, lactose and melibiose.
(i) *G. suboxydans* 1945 $Y_3$ and 2026 $Y_3$ produce acid from sorbose. *G. suboxydans* 1993 $Y_1$ and 2026 $Y_2$ produce no acid from sorbose.
(j) Good growth at 25° C. to 30° C. at pH 3.5.
(k) Positive in catalase reaction.
(l) Gram-negative.
(m) Requiring pantothenic acid in growth.

In addition to the above described organisms, the use of other Gluconobacter species producing L(+)-tartaric acid, *G. industrius*, *G. nonoxygluconicus*, *G. scleroideus* and the like is preferred.

It is also to be understood that for the production of L(+)-tartaric acid this invention is not limited to these particular organisms or to organisms fully answering the above characteristics which are given for illustrative purposes. In fact, it is desired and intended to include the use of mutants produced from the described organisms by various means, such as X-radiation, ultraviolet radiation, nitrogen mustard, phage exposure, and the like.

The compound of this invention is produced when the elaborating organism is grown in an aqueous nutrient medium under submerged aerobic conditions. It is to be understood also that for the preparation of limited amounts surface cultures in bottles can be employed. The organism is grown in a nutrient medium containing a carbon source, for example, an assimilable carbohydrate, and a nitrogen source, for example, an assimilable nitrogen compound or proteinaceous material. Preferred carbon sources includes sucrose, glycerine, lactose, glucose, and the like. Preferred nitrogen sources include ammonium sulfate, ammonium chloride, ammonium nitrate, casamino acid, peptone, meat extract, corn steep liquor, urea, and the like. Combination of these carbon and nitrogen sources can be used advantageously. Metals, for example, sodium, potassium, calcium, magnesium, manganese, iron and the like can be advantageously added to the fermentation media as carbonates, phosphates or sulfates. However, when traces are desired to incubate the broth among the above metals, they need not be added to the media since tap water and unpurified ingredients are used as media components.

Production of the compound of the invention can be effected at any temperature conductive to satisfactory growth of the organism, for example, from about 20° C. to 30° C. It is preferred to conduct the incubation for 2 to 8 days.

Although the presence of more than 0.1 mg./l. of pantothenic acid is necessary to increase the amounts of yield of L(+)-tartaric acid, it is also desired that the initial pH of the culture media is adjusted preferably to about pH 5 to 6 while the final pH range of about pH 2 to 3 is preferred. For the adjustment of the pH of the media alkali metal hydroxide can be employed, but calcium carbonate or potassium carbonate are preferred. When these compounds are employed for changes of the pH range of the culture media, the produced L(+)-tartaric acid is obtained as a metal salt from the fermentation broth. The salt is preferably converted to the free form by conventional methods in conversion processes.

A variety of procedures can be employed in the isolation and purification of L(+)-tartaric acid, for example, solvent extraction, and crystallization from solvents.

In a preferred recovery process, L(+)-tartaric acid is recovered from its culture medium by separation of the mycelial and undissolved solids by conventional means such as by filtation or centrifugation. The compound of this invention is then recovered from the culture medium by the use of an anion exchange resin.

The amounts of yield of L(+)-tartaric acid are shown below by the changes of added pantothenic acid:

| Amounts of added pantothenic acid (mg./l.): | Amounts of yield (g./l.) |
| --- | --- |
| 0.01 | 0 |
| 0.05 | 0.30 |
| 0.1 | 0.95 |
| 0.5 | 1.80 |
| 1.0 | 3.75 |
| 5.0 | 3.75 |
| 10.0 | 3.90 |

A medium used for the above experiments having the following composition was prepared and introduced into 500 ml. flasks, 20 ml. per flask:

| | G. |
| --- | --- |
| Glucose | 100.0 |
| Ammonium chloride | 3.3 |
| Potassium dihydrogen phosphate | 1.0 |
| Magnesium sulfate (7H$_2$O) | 0.25 |
| Manganese sulfate (5H$_2$O) | 0.048 |
| Ammonium metavanadate | 0.1 |
| Calcium carbonate | 20.0 |
| Water q.s. to make 1.0 l. | |

The flasks of medium were sterilized by heating for about 10 minutes at 110° C. They were then inoculated with *Gluconobacter suboxydans* 2026 Y$_2$ and incubated for 5 days at 26° C.

The following example will serve to illustrate the present invention without limiting it thereto.

EXAMPLE

In 10 l. of water, 1,000 g. of glucose, 10 g. of potassium dihydrogen phosphate, 2.5 g. of magnesium sulfate (7H$_2$O), 1.0 g. of ammonium metavanadate, 0.48 g. of manganese sulfate (4H$_2$O) and 0.1 g. of calcium pantothenate were dissolved. The medium was adjusted to pH 6.0, introduced into 20 l. of a fermentation jar and sterilized at 110° C. for 10 minutes. The sterilized medium was inoculated with *Gluconobacter suboxydans* 2026 Y$_2$ and incubated on a reciprocal shaker at 26° C. for 6 days. After the 2-day culture, the pH of the medium was adjusted to 2.5 to 3.0. The crude broth thus obtained was filtered, and calcium ion in the filtrated broth was removed by the use of a cation exchange resin (Amberlite IR-120). Then, L(+)-tartaric acid was adsorbed on an anion exchange resin (Amberlite IR-45), and thereafter eluted with formic acid. The concentration of the eluate produced 43 g. of L(+)-tartaric acid.

What is claimed is:
1. A method of producing L(+)-tartaric acid which comprises culturing *Gluconobacter suboxydans* in a culture medium containing assimilable sources of carbohydrate, nitrogen, inorganic salts, and more than 0.1 mg./l. of pantothenic acid under submerged aerobic conditions until a substantial amount of L(+)-tartaric acid is produced by said organism in said culture medium.

References Cited

UNITED STATES PATENTS

| 2,314,831 | 3/1943 | Kamlet | 195—47 |
| 2,559,650 | 7/1951 | Lockwood et al. | 195—47 |

LIONEL M. SHAPIRO, Primary Examiner

J. M. HUNTER, Assistant Examiner